Feb. 14, 1961   R. M. BLUCK   2,971,645
EXTRUSION DIE
Filed Feb. 21, 1958   3 Sheets-Sheet 3

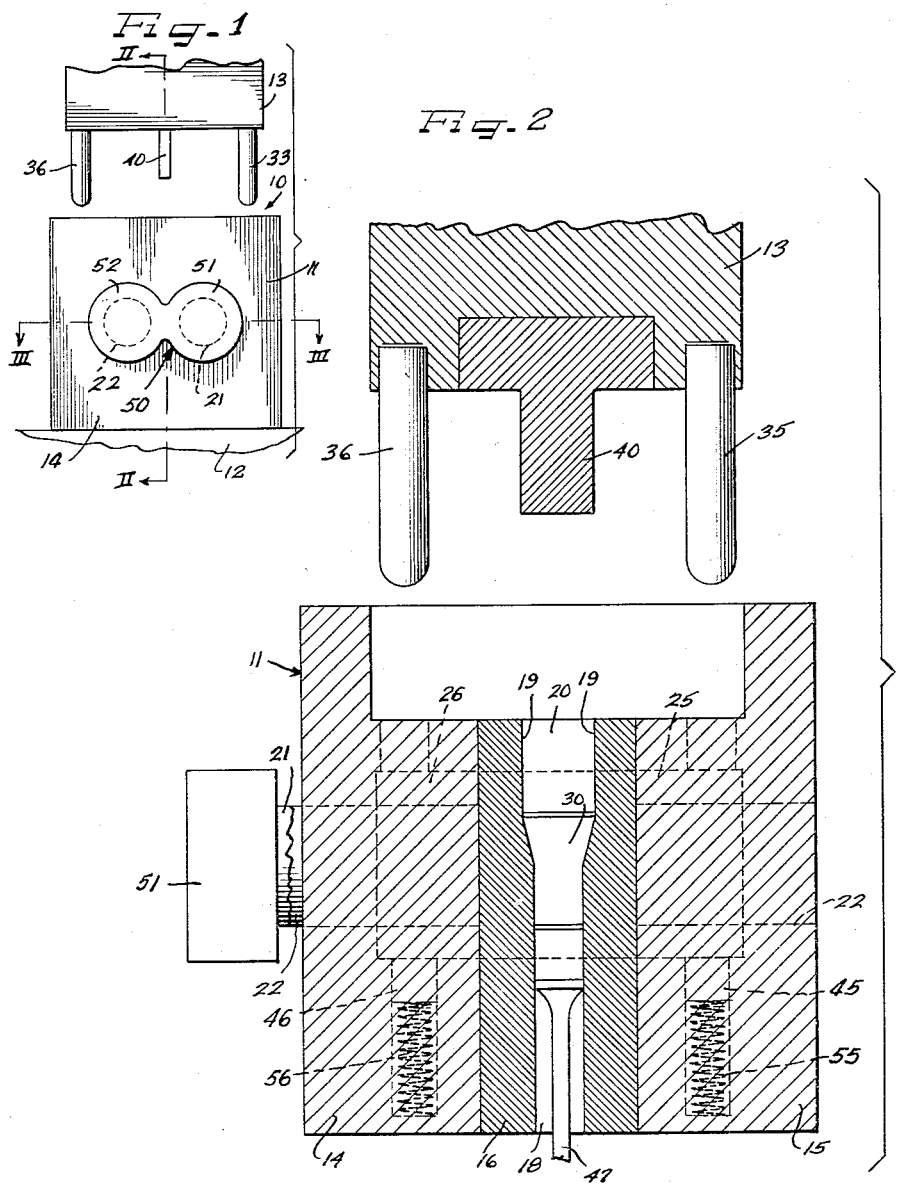

Inventor
Raymond M. Bluck
by Hill, Sherman, Meroni, Gross & Simpson Attys.

United States Patent Office 2,971,645
Patented Feb. 14, 1961

2,971,645

EXTRUSION DIE

Raymond M. Bluck, Euclid, Ohio, assignor to Thompson Ramo Wooldridge, Inc., a corporation of Ohio Filed Feb. 21, 1958, Ser. No. 716,610

2 Claims. (Cl. 207—18)

This invention relates generally to extrusion dies, and more specifically to an improved extrusion die for extruding workpieces having tapers extruded thereon.

Although the principles of the present invention may be included in various dies or die assemblies, for extruding parts of various sectional configurations, a particularly useful application is made in the illustrated embodiment of the instant invention.

The present invention contemplates the utilization of at least one rotatable die having a peripheral groove, the bottom of which is disposed a varying distance from the axis of rotation of the die. The die assembly is carried between the bed and ram of a press, and as the ram advances the workpiece blank through the die, the ram also is effective to rotate the die so that the effective size of the opening is gradually increased during the stroke. Thus as the opening increases, the sectional size of the workpiece also is increased.

Accordingly, it is an object of the present invention to provide an extrusion die assembly which is capable of extruding tapered workpieces.

Another object of the present invention is to provide a die assembly which is capable of producing both straight and tapered workpieces.

Yet another object of the present invention is to provide an extrusion die assembly wherein one side of a workpiece may be extruded and tapered to a different degree than the other side of the workpiece.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

Figure 1 is a schematic view of a die assembly provided in accordance with the principles of the present invention, and disposed in a press, fragmentarily illustrated;

Figure 2 is an enlarged sectional view, partly in elevation, taken generally along line II—II of Figures 1 and 3;

As shown in the drawings:

Figure 3:
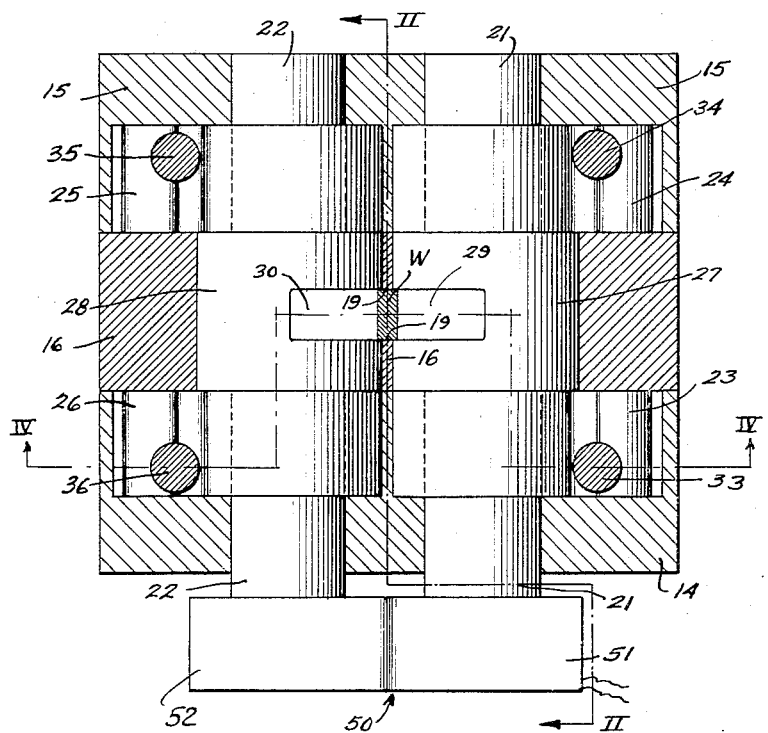
Figure 3 is an enlarged sectional view, partly in elevation, taken generally along line III—III of Figure 1.

The principles of this invention are particularly useful when embodied in an extrusion die assembly such as illustrated in Figure 1, generally indicated by the numeral 10. The extrusion die assembly 10 includes a holder or holder assembly 11 supported on a bed 12 of a press in alignment with a ram 13 thereof.

Referring now to Figure 2, the invention is illustrated in greater detail. In this embodiment, the holder 11 includes a pair of complementary holder or journal blocks 14, 15 between which is disposed a guide block 16. The blocks 14–16 may comprise a greater or lesser number of pieces, as desired, and in this embodiment are held together by a plurality of tie rods 17, best seen in Figure 4. The guide block 16 of the holder 11 is provided with an aperture 18 which is aligned with and extends in the direction of the ram 13. The upper end of the aperture 18 is defined by a plurality of walls 19, best seen in Figure 2, which are spaced from each other to form an enlarged recess 20 at the end thereof adjacent to the ram. The blocks 14–16 of the holder 11 are each provided with a pair of transversely directed openings within each of which is received a shaft 21, 22 respectively, as best seen in Figure 3.

The shafts 21 and 22 are rotatably journalled in the holder blocks 14 and 15, and are so supported therein that their axes are parallel to each other and lie in a common plane which is normal to the direction in which the ram 13 of the press may be reciprocated.

Each of the shafts 21, 22 is provided with a pair of lever elements 23—26 or lever-like portions, respectively. The lever elements 23—26 extend radially from the shafts 21, 22 and are corotatably or drivingly connected therewith. By the application of a force to one of the lever elements 23—26, the associated shafts 21, 22 may be moved angularly or rocked.

Each of the shafts 21, 22 is provided with a generally cylindrical die or die element 27, 28 which is corotatably supported and associated therewith. Each of the die elements 27, 28 has a mutually adjacent peripheral extrusion groove 29, 30. The grooves 29, 30 may be of any sectional configuration, but conforming to that desired of the workpiece.

Figure 4:
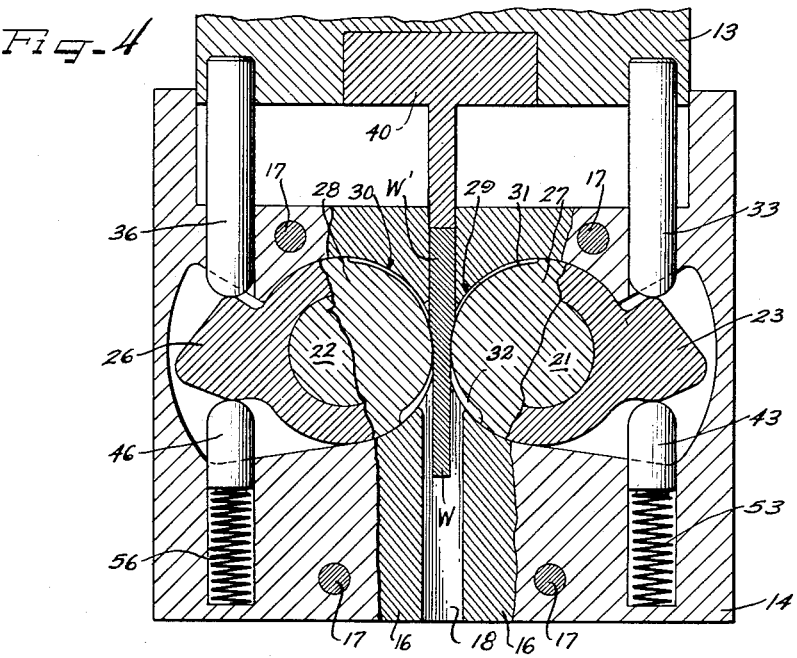
Figure 4 is a sectional view taken generally along the line IV—IV of Figure 3, with certain parts shown in elevation, and at the start of a working stroke.

As best seen in Figure 4, the bottom of the groove may extend partially about the rotational axis of the die. Further, it will be noted that the groove 29 of the die element 27 has a portion 31 which extends or is disposed a uniform distance from the axis of rotation. This portion of the groove produces a non-tapered portion on the work-piece. More significantly, however, a portion 32 of the groove 29 has a bottom which extends or is disposed a varying distance from the axis of rotation. The portion 32 is used to form a tapered section on the workpiece W. In this embodiment, the die element 28 and its groove 30 are identical to the grooved element 27.

As best seen in Figures 3 and 4, each of the lever elements 23—26 is provided with an actuator pin member 33—36 which jointly comprise a die actuating linkage. The actuator pin member is slidably guided by the holder 11 so that one end of the pin members 33—36 is in engagement with the lever elements 23—26, while the other end of the pin members is engaged by the ram 13. Figure 2 illustrates the pin members 33—36 as having a supporting fit with the ram 13. However, since the holder 11 guides the pins 33—36, support of such pins by the ram 13 is not required. Thus when the ram is lowered, or is on its working stroke, the pins 33—36 act on one side of the lever elements 23—26 to rotate the die elements 27, 28 in one direction.

It will be noted that the recess 20 is aligned with the grooves 29, 30, and is generally shaped to correspond to the configuration of the workpiece blank W' to be extruded.

As best seen in Figure 4, the ram 13 supports a plunger 40 having a work engaging portion, here shown to be rectangular, and corresponding in sectional configuration to the sectional configuration of the recess 20. Thus, the reciprocation of the ram 13 also reciprocates the plunger 40 into and out of the recess 20 and into and out of engagement with the workpiece blank W'.

It is now apparent that advancement of the plunger 40 forces the material of the workpiece blank W' through the opening defined by the walls 19 of the holder 11 and the grooves 29, 30 to extrude the same. It is also now apparent that continued advancement of the ram 13 also produces angular movement of the dies 27, 28 so as to alter the effective size of the opening therebetween during the extrusion of the workpiece W therefrom.

Figure 5:
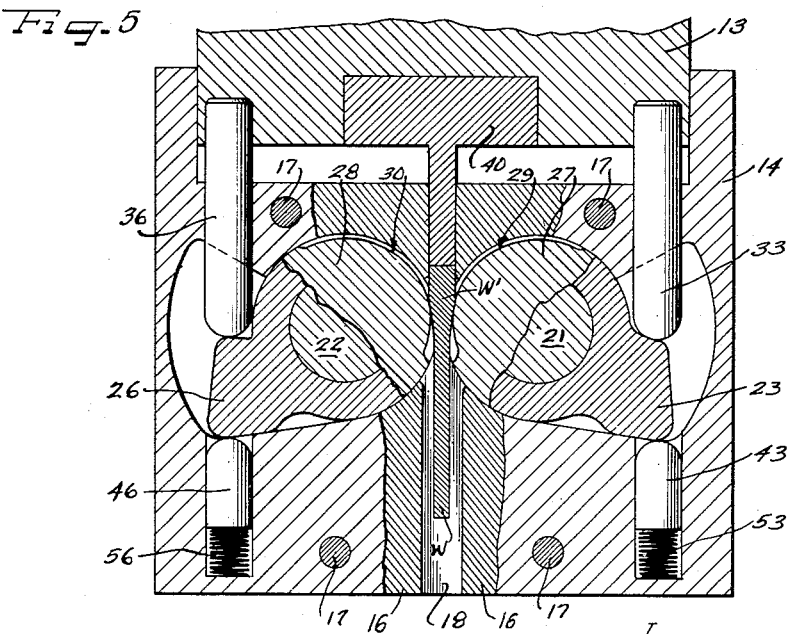
Figure 5 is a view generally similar to Figure 4 at the end of a working stroke.

In order that the die elements 27, 28 may not advance ahead of the actuator pins 33—36, and in order to provide a return torque for the die elements 27, 28, means are provided to provide a torque which is reactive to the force exerted by the ram on the lever elements 23—26. To this end, there is provided in this embodiment a reaction means including a return plunger, such as 43, 45, 46, resiliently biased, as by a spring, such as 53, 55, 56 against the lower or other side of each of the four lever elements 23—26. If it be desired to limit the angular travel of the die elements 27, 28, the reaction means associated with each of the lever elements 23—26 may also provide such a stop. This may be done by selecting a spring 53, 55, 56 which is compressed to solid height at the proper point. Also, as best seen in Figure 5, the housing blocks 14 and/or 15 may be so internally configured as to provide an integral stop for the lower or reaction surface of the lever elements 23—26. In a like manner, the length of the actuator pins 33—36 determines the amount of movement which the plunger 40 may have before the die elements begin to rotate, while the internal configurations of the housing blocks 14, 15 determine the upper limit of travel of the lever elements 23—26.

As best seen in Figure 3, it is also preferable to include a brake element 51, 52 for each of the shafts 21, 22. The detailed construction of the brake elements do not form a part of the instant invention, any one of various well-known brake structures being usable herewith. The instant embodiment schematically illustrates the brake elements 51, 52 as being electrically actuated, which actuation may be individual or joint. The instant embodiment also shows the brake elements carried in a common housing 50 whereby each provides the reactive force for the other.

When the brakes 51 and 52 are energized at the end of a power stroke, the die elements 27, 28 are held in an open position against the force exerted by the several return plungers 43, 45, 46, during which condition the workpiece may be removed.

To this end, as best seen in Figure 2, an ejector 47 is disposed in the aperture 18 of the guide block 16 to act on the extruded portion of the workpiece W, so as to reverse its direction of movement outwardly through the recess 20, and in the direction of the return stroke of the ram 13.

A feature of the instant invention is that the brakes 51, 52 may be energized, and kept energized, with the parts relatively disposed to each other as shown in Figure 5. If this be done, non-tapered parts can be produced. Also, if only one of the brake elements be energized, when the parts are arranged as shown in Figure 5 and thereafter operated, one side of the workpiece W will be extruded by a rotating or tapering die, while the other side will be extruded by a fixed position die or wall.

It is also to be understood that if the rotation of one of the dies is to be stopped as above described, at a point other than at the end of the working stroke, the die may be advanced to its proper position, the associated brake or brakes energized, and thereafter the associated actuator pins 33—36 removed. It is thus apparent that an advantageous structure having only one rotating die may be provided in accordance with the principles of the instant invention, even without changing the structure thereof.

Although various minor modifications might be suggested by those versed in the art, it should be understood that I wish to embody within the scope of the patent warranted hereon all such embodiments as reasonably and properly come within the scope of my contribution to the art.

I claim as my invention:

1. An extrusion die assembly for use between the bed and reciprocable ram of a press, comprising in combination: a holder adapted to be supported by the bed; a pair of shafts rotatably journalled in said holder, the rotational axes of said shafts being generally parallel to each other and lying in a common plane normal to the direction of ram movement; a pair of separate lever elements extending radially from said shafts, each of said shafts supporting one of said lever elements and being co-rotatable therewith; a pair of generally cylindrical die elements, each of said shafts supporting one of said die elements and being co-rotatable therewith, said die elements each having a mutually adjacent peripheral extrusion groove located at a point axially offset but generally diametrically opposite to said lever elements, the bottom of which groove extends partially about the rotational axis and is disposed a varying distance therefrom; a plurality of actuator members slidably received in said holder and disposed to be actuated by the ram and to act on said lever elements to rotate each of said die elements about said axis so that said extrusion grooves move in a direction opposite to the workpiece during extrusion thereof, whereby the workpiece section is reduced by extrusion alone; said holder having walls defining a recess intermediately disposed and aligned with the ram and said grooves for receiving a workpiece blank to be extruded; a plunger adapted to be reciprocated by the ram into said recess against the workpiece blank; separate means operated independently of the ram for applying a torque to said die elements about said axes in the other direction; brake means operative on said shafts for preventing rotation of said die elements during the return stroke of the ram; and an ejector reciprocably disposed in alignment with said recess and operative on the portion of the workpiece which has passed through said die elements to move the workpiece in the direction of the return stroke of the ram.

2. An extrusion die assembly for use between the bed and reciprocable ram of a press, comprising in combination: a holder adapted to be supported by the bed; a shaft rotatably journaled in said holder, the rotational axis of said shaft lying in a plane normal to the direction of ram movement; a separate lever element extending radially from said shaft, said shaft supporting said lever element and being co-rotatable therewith; a pair of die elements in said holder, one of said die elements being generally cylindrical, said shaft supporting said one of said die elements and being co-rotatable therewith, said one die element having a peripheral extrusion groove adjacent to the other die element, said extrusion groove being located at a point axially offset but generally diametrically opposite to said lever element, the bottom of which groove extends partially about the rotational axis and is disposed a varying distance therefrom; an actuator member slidably received in said holder and disposed to be actuated by the ram and to act on said lever element to rotate said one die element about said axis in such direction that said extrusion groove moves in a direction opposite to the workpiece during the extrusion thereof, whereby the workpiece section is reduced by extrusion alone; said holder having walls defining a recess intermediately disposed between and aligned with the ram and said groove for receiving a workpiece blank to be extruded; a plunger adapted to be reciprocated by the ram into said recess against the workpiece blank; separate means operated independently of the ram for applying a torque to said one die element about said axis in the other direction; and brake means operative on said shaft for preventing rotation of said one die element during the return stroke of the ram.

References Cited in the file of this patent

UNITED STATES PATENTS

| | | |
|---|---|---|
| 1,199,080 | Jones | Sept. 26, 1916 |
| 2,054,370 | Gross | Sept. 15, 1936 |
| 2,237,112 | Parvin | Apr. 1, 1941 |
| 2,389,876 | Sequin | Nov. 27, 1945 |
| 2,740,635 | O'Toole | Apr. 3, 1956 |

FOREIGN PATENTS

| | | |
|---|---|---|
| 387,601 | Great Britain | Feb. 9, 1933 |
| 1,004,361 | France | Nov. 28, 1951 |